United States Patent
Töller et al.

(10) Patent No.: US 11,819,944 B2
(45) Date of Patent: Nov. 21, 2023

(54) CARRIER COMPONENT FOR A VEHICLE APPLICATION, AND METHOD FOR PRODUCING A CARRIER COMPONENT OF THIS TYPE

(71) Applicant: Kirchhoff Automotive Deutschland GmbH, Attendorn (DE)

(72) Inventors: Marco Töller, Cologne (DE); Michael Bauer, Plettenberg (DE); Christian Dahmen, Olpe (DE); Josef Bartzik, Iserlohn (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 353 days.

(21) Appl. No.: 16/482,671

(22) PCT Filed: Mar. 20, 2018

(86) PCT No.: PCT/EP2018/056936
§ 371 (c)(1),
(2) Date: Jul. 31, 2019

(87) PCT Pub. No.: WO2018/172311
PCT Pub. Date: Sep. 27, 2018

(65) Prior Publication Data
US 2019/0344385 A1 Nov. 14, 2019

(30) Foreign Application Priority Data

Mar. 21, 2017 (DE) .......................... 102017106001.4

(51) Int. Cl.
*B23K 26/262* (2014.01)
*B23K 9/025* (2006.01)
(Continued)

(52) U.S. Cl.
CPC .......... *B23K 26/262* (2015.10); *B23K 9/0253* (2013.01); *B23K 33/006* (2013.01);
(Continued)

(58) Field of Classification Search
CPC ............ B23K 2101/006; B23K 26/262; B23K 9/0253; B23K 33/008; B23K 2101/04; B23K 33/006
(Continued)

(56) References Cited

U.S. PATENT DOCUMENTS

| 8,950,794 B2 | 2/2015 | Lenkenhoff |
| 9,446,799 B2 | 9/2016 | Franzpötter |

(Continued)

FOREIGN PATENT DOCUMENTS

| CN | 102601552 A | 7/2012 |
| DE | 102007044570 A1 | 3/2009 |

(Continued)

OTHER PUBLICATIONS

Office Action dated Jul. 20, 2021 in related Chinese application 201880013097.6.

(Continued)

*Primary Examiner* — Dana Ross
*Assistant Examiner* — James F Sims, III
(74) *Attorney, Agent, or Firm* — POLSON INTELLECTUAL PROPERTY LAW, PC; Margaret Polson; Christopher Sylvain

(57) ABSTRACT

A carrier component for a vehicle application, formed by two half-shells that are welded to one another at contact sides. When assembling the two half-shells for joining same at the contact sides, in a position in which the two half-shells are arranged above one another, the point of contact of the lower half-shell protrudes in relation to the external closed side of the other half-shell. The point of contact of one of the (Continued)

two half-shells protrudes inward in relation to the internal closed side of the other half-shell. A method for producing a carrier component from two half-shells is also disclosed.

10 Claims, 2 Drawing Sheets

(51) Int. Cl.
*B23K 33/00* (2006.01)
*B23K 101/00* (2006.01)
*B23K 101/04* (2006.01)

(52) U.S. Cl.
CPC ...... *B23K 33/008* (2013.01); *B23K 2101/006* (2018.08); *B23K 2101/04* (2018.08)

(58) Field of Classification Search
USPC ...................................................... 219/121.6
See application file for complete search history.

(56) References Cited

U.S. PATENT DOCUMENTS

| | | |
|---|---|---|
| 9,598,100 B2 | 3/2017 | Lenkenhoff |
| 9,764,764 B2 | 9/2017 | Irle |
| 10,005,495 B2 | 6/2018 | Töller |
| 10,577,025 B2 | 3/2020 | Michler |
| 2005/0152741 A1* | 7/2005 | Fujimoto ............... B23K 26/22 403/270 |
| 2010/0259070 A1* | 10/2010 | Klein ..................... B62D 25/04 296/193.06 |
| 2011/0259859 A1* | 10/2011 | Dietl ..................... B23K 26/28 219/121.64 |
| 2013/0337285 A1 | 12/2013 | Gruber |
| 2014/0064831 A1* | 3/2014 | Tamai ................... B62D 21/00 403/270 |
| 2019/0185060 A1 | 6/2019 | Gündogan |

FOREIGN PATENT DOCUMENTS

| | | | |
|---|---|---|---|
| EP | 236214 A1 | 9/2011 | |
| WO | 0176930 A1 | 10/2001 | |
| WO | WO-0176930 A1 * | 10/2001 | ......... B21C 37/0803 |
| WO | WO-2010015246 A1 * | 2/2010 | ............. B23K 33/00 |

OTHER PUBLICATIONS

Office Action dated Dec. 23, 2020 in related Chinese application 201880013097.6.
International Search Report dated Sep. 27, 2018 in parent PCT application PCT/EP2018/056936.
International Preliminary Report on Patentability dated Jun. 14, 2019 in parent PCT application PCT/EP2018/056936.
Examination report dated Mar. 2, 2022 in related European application 18713833.4.

\* cited by examiner

CARRIER COMPONENT FOR A VEHICLE APPLICATION, AND METHOD FOR PRODUCING A CARRIER COMPONENT OF THIS TYPE

BACKGROUND

The present disclosure relates to a carrier component for a vehicle application, formed by two half-shells that are welded to one another at contact sides, wherein the point of contact of the lower half-shell protrudes in relation to the external closed side of the other half-shell in the assembling of the half-shells for outward joining of same, in a position in which the two half-shells are arranged above one another. The present disclosure further relates to a method for producing such a carrier component.

Carrier components for vehicle applications, when they are produced from a steel sheet, are implemented frequently in monocoque form. Such carrier components may be rails or carriers of differing application in a box-type construction. Such carrier components are used in the form of box or round profiles or even with a differentiated contour geometry when such a carrier component is provided, for example, as part of a sub-frame. The half-shells used to form such a carrier component have a U-shaped cross-sectional geometry. Two half-shells are connected to one another in the area of their end sections forming the legs of the cross-sectional shape by means of joining, typically welding, in order to form the carrier component. The free end surfaces of the legs each form a point of contact.

In numerous application cases, the end sections of the legs are beveled outward to form a joining flange. Half-shells to be connected to one another adjoin one another with their joining flanges and are welded to one another by means of same. According to another embodiment for producing such a carrier component, two half-shells are retained in an overlapping connection, in which the end sections of the parallel legs of the one half-shell engage the U-shaped mount of the other half-shell. They thus rest against the inner side of the legs of the other half-shell with their side pointing outward. In order to produce the joint connection between these two half-shells, the half-shell accommodating the end sections of the other half-shell is then welded on the outer point of contact. The disadvantage with such an overlapping connection is the double layer of material in the area of the overlap, which leads to increased weight of the carrier component. It is also considered to be disadvantageous sometimes with this component that the width of the half-shells is different, whereby the installation space available cannot be optimally utilized. In particular, a conventional design means a smaller cross-section and thus less stiffness than the available installation space would actually allow. According to a further embodiment, in order to produce such a carrier component, two half-shells, which are identical with respect to the span of the point of contact—the outer wall spacing between legs opposite one another in the area of the points of contact—are retained adjacent to one another with their points of contact, in order to then connect two half-shells by means of a weld in the I-joint.

The weight of such a carrier component produced in this manner is less due to the absence of the double layer of material. However, the disadvantage is that the joining of the half-shells must be carried out in two stages, because welding from the side or overhead to create the desired point-of-contact joint connection is not very successful. Thus, with this concept, disadvantages that relate to the processing time and workpiece handling must be expected, because the assembly between the two weld seams implemented in the flat position must be turned. In addition, with this concept, a twisting of the component (torsion) in the direction of extension of the weld seam must be expected due to the single-sided welding. This sometimes requires an additional process step such as, for example, a subsequent alignment or laborious adaptation of the handling apparatus or of the welding process such as, for example, the opposite and time-delayed attachment of quilted weld seams or upstream tack-welding.

For longitudinal welding on both sides of two half-shells in order to form a boom profile, it is known from DE 10 2007 044 570 A1 to form the upper half-shell with a smaller sheet thickness and the lower half-shell with a larger sheet thickness. The span of the inner wall of the two profile half-shells is the same so that the points of contact can be aligned with one another by applying a radial force to the flush arrangement of the inner walls of the two profile half-shells. The purpose of the different sheet thickness is so that the point of contact of the lower half-shell protrudes with respect to the external closed side of the upper half-shell. This protrusion enables a contact-side joining of the two half-shells in the PC position without any additional weld pool backing. A significant apparatus setup is required for joining. The half-shells are first positioned with their points of contact toward one another and tack-welded. To do this, the inner walls of the half-shells are supported in the area of the points of contact. One-stage welding is not possible with the previously known concept. The sheet thickness is 8 mm with this prior art. The protrusion formed by an offset of the point of contact of the lower half-shell as it relates to that of the upper half-shell is about 50% of this material thickness and thus several millimeters.

This previously known method is not suitable for producing carrier components with smaller dimensions than the boom as they are used, for example, with vehicles as a carrier component, such as a rail or a sub-frame for example. Moreover, with continuously sealed carrier components, a support of the two half-shells on the inner wall is not possible in the area of the point of contact.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Proceeding from the foregoing, an aspect of the present disclosure is to propose a carrier component for a vehicle application, which is not only characterized by less weight as relates to the half-shell connection but that likewise can be produced in a single joining step. Another aspect is to propose an improved method for producing two half-shells of the carrier component which are U-shaped in cross-section.

The component-based aspect is achieved by a carrier component for a vehicle application formed by two half-shells that are welded to one another at contact sides, wherein the point of contact of the lower half-shell protrudes in relation to the external closed side of the other half-shell in the assembling of the half-shells for outward joining of same, in a position in which the two half-shells are arranged above one another, and wherein the point of contact of one of two half-shells protrudes inward as relates to the internal closed side of the other half-shell.

The method-based aspect is achieved by a method with the following steps:

providing two half-shells adjacent to one another at contact sides with differing span of the point of contact;

arranging and retaining the half-shells with their points of contact adjacent to one another, with allowance of a capillary gap, in such a way that the points of contact of one of the two half-shells protrude outward as relates to the point of contact of the other half-shell and said protrusion is pointing upward and the points of contact of the other half-shell protrude inward as relates to the points of contact of the first half-shell and said protrusion is pointing downward; and subsequently simultaneous fusioning of the points of contact, being held adjacent to one another, of the wall sections opposite one another externally to form a weld seam extending over the point-of-contact overlap;

The term "point of contact" used within the scope of these embodiments is understood to be the front side of the beveled leg of a half-shell, which the point of contact—the front side—of the side walls of the other half-shell adjoins.

With this carrier component, the two half-shells are joined together, typically welded, at the contact sides. In order to join the two half-shells together at their two points of contact opposite one another in the same position of the half-shells to be joined, the points of contact of the half-shells are matched to one another such that the point of contact of the one half-shell protrudes somewhat outward as relates to the external closed side of the point of contact of the other half-shell. With this carrier component, the point of contact of one of the two half-shells is additionally designed so as to protrude inward as relates to the internal closed side of the other half-shell. The protrusion of the points of contact does not have to be especially large. During the process of joining, the outward protrusion points upward such that welding can take place in a position in which the two half-shells are arranged above one another, for example can be joined in the PC position or PB position, and sometimes also in other positions, as this was possible in the prior art. Surprisingly it has been shown that, in order to weld two steel sheet half-shells, a protrusion of only greater than 0 mm, preferably greater than or equal to 0.1 mm, is sufficient in order to provide a sufficient weld seam backing on the outside of the half-shells to be joined together at the contact sides. The points of contact adjacent to one another and opposite one another as relates to the span of the point of contact can be joined simultaneously. The protrusion acts as joining pool backing and prevents liquid joining material—known as the melted material with welding—that forms during the joining process from flowing off uncontrollably. In this respect, it was surprisingly determined during the development of this concept that even a point-of-contact protrusion of only about 0.1 mm, i.e. a point-of-contact protrusion not perceptible or barely perceptible with the naked eye, is sufficient for being able to join the adjacent points of contact with one another properly. Thus, if desired, two half-shells only slightly different with respect to their span of the point of contact can be joined together at the contact sides without having to accept the disadvantages shown in the prior art. Because the joining of the two half-shells can be carried out in a common joining step, a twisting of the component (torsion) in the direction of extension of the weld seam is kept at a minimum. Due to the inward protrusion, initially poorer welding results were to be expected with a carrier component joined together at the point of contact in this manner Surprisingly, however, precisely the opposite was found. Based on the described circumstances, the welding results were comparable, with respect to their resilience, to half-shells welded at the point of contact without overhang, despite the less overlap. When examining the weld samples, this normally led to failure of the base material but not the weld seam.

The previously described feature that even a protrusion of about 0.1 mm, and sometimes even somewhat less, suffices to serve as weld pool backing is likewise determined given the circumstance of the surface tension of the weld pool and given that the two half-shells adjoin one another at their points of contact during joining, with allowance of a capillary gap. For this reason, this carrier component is especially suitable to be produced from half-shells with less wall thickness as well. Due to the previously described less cross-sectional surface of the point of contact, the input of energy required for welding can be kept low in order to form a weld seam extending over the point of contact, due to the previously described effects. The outward and the inward overhangs are burned off and/or incorporated into the weld melt as a weld filler metal. The notch effect acting on the joining seam is thereby reduced to a minimum, which is why such carrier components are primarily suitable as chassis parts. Preferably, the joining process is implemented such that the points of contact are connected over the entire contact width with friction-locking such that, due to the inward protrusion, a fillet weld, on which the inward protrusion is available as a weld filler metal, is also formed inward. This can be adjusted by means of a corresponding energy input with the MAG welding used or a different welding process, such as MIG or laser welding, or by means of the welding speed as well. It is especially advantageous that this welding process can be implemented in one stage, which has a beneficial effect on the production process. The previously described special results can be realized with an inner wall support, if it is provided. Thus, degassing toward the inside is possible even with an inward support on the inward-protruding half-shell with a certain distance to the point of contact due to the protrusion. As a result of degassing toward the interior of the joining point and thus in the direction of the action of the welding energy supplied to the joining point, the outward formation of a very clean weld seam is enabled, without having to worry that melted material will spatter to a significant degree. In addition to the surface tension, this also explains the formation of an outward weld seam without additional weld pool backing with a protrusion or overhang of the point of contact of the lower half-shell of about 0.1 mm or a few tenths of a millimeter more.

A further advantage of this method is that, in addition to an extremely narrow wall thickness required particularly in automobile construction, the half-shells additionally have an equivalent wall thickness and thus the carrier component produced therefrom is optimized with respect to weight.

In this regard, full penetration welding can actually be achieved by fully utilizing this concept despite the outward welding. The preferred formation of a fillet weld on the inside reinforces the weld seam significantly because a notch effect is effectively counteracted at this point.

By ensuring degassing towards the inside with the process of melt joining, such a carrier component can be produced from coated as well as uncoated half-shells. The intended internal degassing has an especially advantageous effect, primarily with melt-joining of coated half-shells, because the degassing supports the process of full penetration welding.

Advantageous with this concept is that it is insignificant for achieving the previously described advantages whether the inward overhang is provided by the point of contact of the lower half-shell or that of the upper half-show.

In designing such a carrier component, the application requirements placed on it must be considered. This also relates to the necessary strength of the adjacent points of contact of the two half-shells, which is why a certain minimum overlap must be provided. The point-of-contact overlap should therefore not be less than 50% of the wall thickness. If different wall thicknesses are used, the overlap cannot fall below this value in relation to the half-shell with the thinner wall thickness on the contact side. Typically, such carrier components are produced from steel sheet with wall thicknesses of greater than or equal to 2.0 mm in order to prevent any corrosion problems. With consideration of the only minimal, required point-of-contact protrusion greater than 0.0 mm, preferably 0.1 mm, an overlap of even more than 90% is possible with such half-shells having the same wall thickness in the area of their points of contact. A field to be maintained with consideration of production tolerances thus results, with a minimum overlap of 50% and a minimum protrusion greater than 0.0 mm, for example 0.1 mm, which can be maintained with conventional production technologies.

The point-of-contact protrusion of the one half-shell as compared to the other half-shell can be formed in different ways. Thus, it is possible, for example, to design two half-shells produced with equal wall thickness with respect to their span of the point of contact such that the span of the point of contact of the one half-shell is greater than that of the other half-shell by a doubled protrusion. With consideration of an only minimal, necessary protrusion, the width of the half-shells differs only slightly with such a design. It is also possible to connect two half-shells of different wall thickness with one another, wherein the half-shell with the thicker wall thickness typically simultaneously provides the point-of-contact protrusions. It is also possible to connect two half-shells of essentially the same wall thickness with one another, wherein, with the one half-shell, the end section supporting the points of contact is somewhat thickened toward the point of contact and that is by the intended point-of-contact protrusion.

In addition to the aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is described below using example embodiments with reference to the attached figures.

Figure 1:
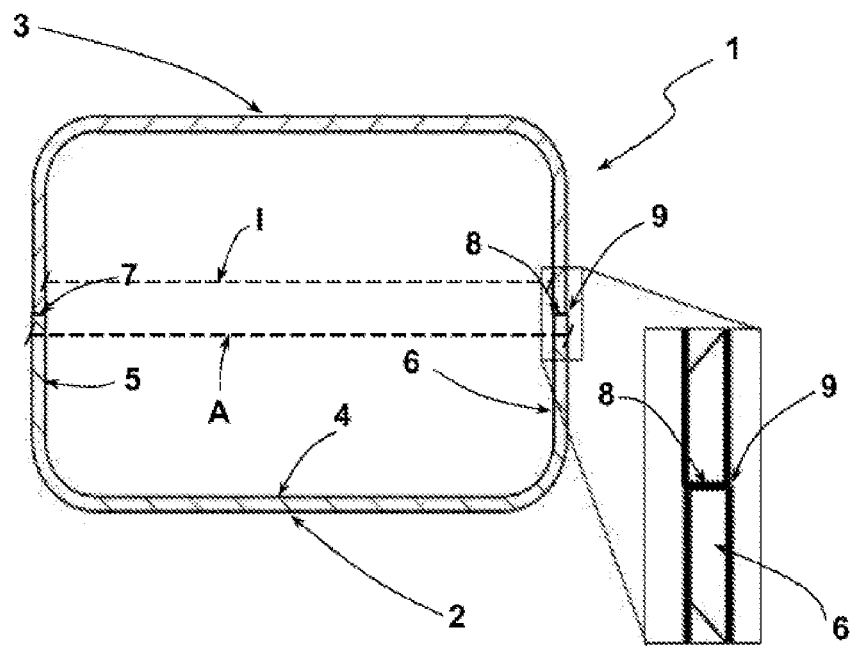
FIG. 1 shows a schematic cross-section through a carrier component according to a first embodiment.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

A carrier component 1 for a vehicle application is produced from two half-shells 2, 3. The two half-shells 2, 3 have a U-shaped cross-sectional geometry and each comprise a belt 4 (only indicated for the half-shell 4), on which two legs 5, 6 are formed. The legs 5, 6 are beveled as relates to the belt 4 and extend parallel to one another. The material thickness of half-shell 2 is 2 mm in the embodiment shown. The end surfaces of the belts 5, 6 each form a point of contact 7, 8. Half-shell 3 is constructed just as half-shell 2 and has its points of contact placed on the points of contact 7, 8 of half-shell 2 in the arrangement shown in FIG. 1. The two half-shells 2, 3 differ in their outer wall spacing A between the points of contact being held adjacent to one another. The outer wall spacing A of half-shell 2—the span of the point of contact—is a few tenths of a millimeter greater than the span of the point of contact of half-shell 3. The larger design of half-shell 2 with respect to this can be seen in the sectional enlargement shown for FIG. 1. Due to this design, the point of contact 8 of half-shell 2 protrudes outward with respect to the complementary point of contact of half-shell 3. This protrusion 9 is 0.15 mm on each side in the embodiment shown; however, an embodiment with 0.5 mm is also possible. The surface formed by the protrusion 9 is used to connect the two half-shells 2, 3 with one another in a welding process as a weld pool support. The welding process itself is described further below with reference to FIG. 4.

With the carrier component 1, the inner wall spacing I of the two half-shells 2, 3 also differ from one another. The inner wall spacing I is indicated on the upper half-shell 3 in FIG. 1. The protrusion of the point of contact 7 of half-shell 3 as relates to the point of contact of half-shell 2 corresponds to the dimension of the protrusion 9 and thus is likewise about 0.15 mm, as can be seen in the sectional enlargement.

Figure 2:
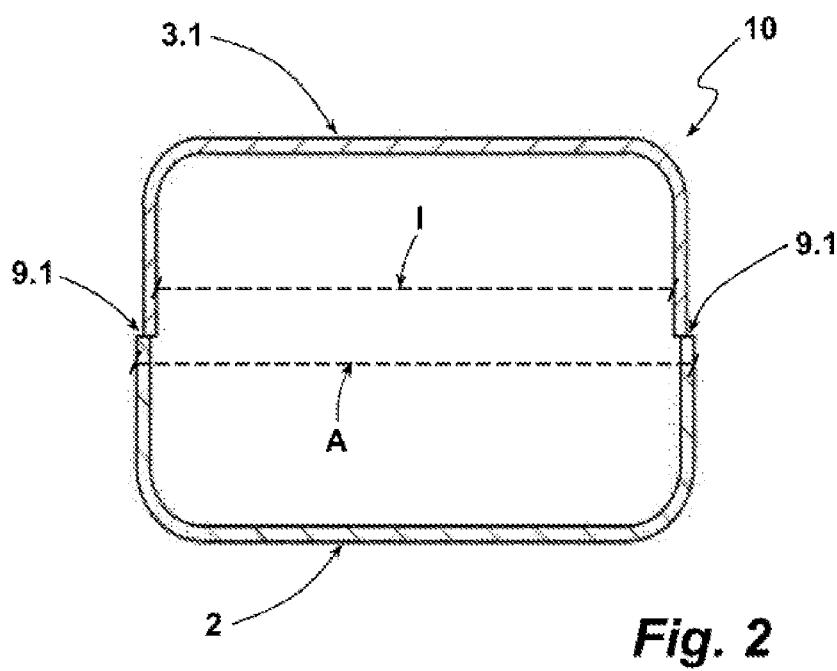
FIG. 2 shows a schematic cross-section through a carrier component according to a further embodiment.

FIG. 2 shows a further carrier component 10, which is constructed just as carrier component 1 from FIG. 1. Carrier component 10 differs from carrier component 1 in that the span of the point of contact of half-shell 3.1 is discernibly less as relates to the point of contact or the outer wall spacing A of half-shell 2. The result is that the protrusion 9.1 with this carrier component 10 is greater than with carrier component 1 of FIG. 1. With this carrier component 10 as well, an inward protrusion is formed as relates to the inner wall of the lower half-shell 2 by the point of contact of the upper half-shell 3.1.

Because the wall thickness of the half-shells 2, 3, 3.1 is the same with carrier components 1, 10, carrier components 1 and 10 differ with respect to the degree of overlap of the adjacent points of contact of the half-shells. If an overlap of 92.5% is achieved with carrier 1, it is thus only the minimum required 50% with carrier 10.

Figure 3:
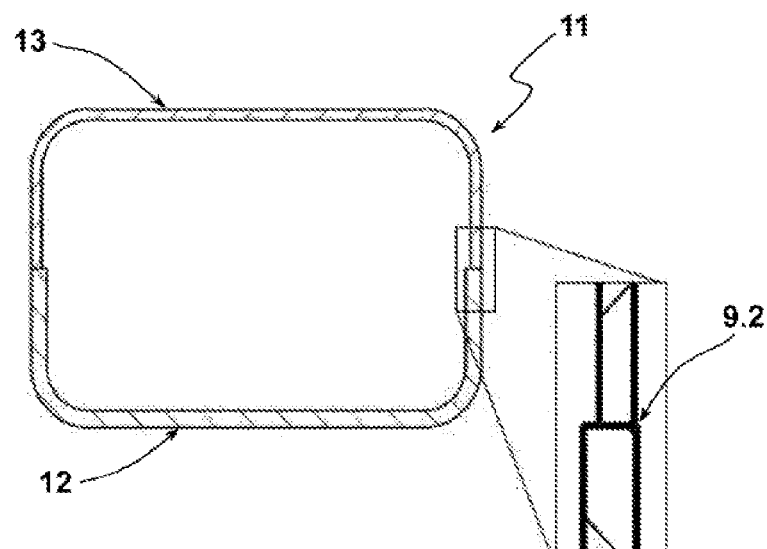
FIG. 3 shows a schematic cross-section through a carrier component according to yet a further embodiment.

FIG. 3 shows yet a further carrier component 11. The lower half-shell 12 of carrier component 11 has a larger wall thickness than the upper half-shell 13. The larger wall thickness with this embodiment is used to also form the desired protrusion 9.2, which is also kept very minimal with this embodiment and is likewise only about 0.15 mm Due to the larger material thickness of the lower half-shell 12 of carrier component 11 of this embodiment, the inner protrusion is also provided by the point of contact of the lower half-shell 12.

Carrier components 1, 10, 11 are shown with the half-shells adjoined with their points of contact in the figures before the half-shells are welded to one another. In order to fuse the two half-shells 1, 2; 2, 3.1; 12, 13 of the carrier components 1, 10, 11, they are positioned with respect to one another such that the respective protrusion 9, 9.1, 9.2 is established on the elongated sides. This positioning is shown in FIGS. 1 to 3 as relates to carrier components 1, 10, 11. In doing so, it is provided that the respective protrusion 9, 9.1, 9.2 is always greater than 0.0 mm with the welding process, even with consideration of a differing distortion of the points of contact being held adjacent one another. A change in the span of the protrusion 9, 9.1, 9.2 can take place by heating during the joining.

Due to the unavoidable unevenness of the adjacent points of contact of the half-shells 2, 3.1, a gap is located between the points of contact, which supports degassing during the welding process.

Figure 4:
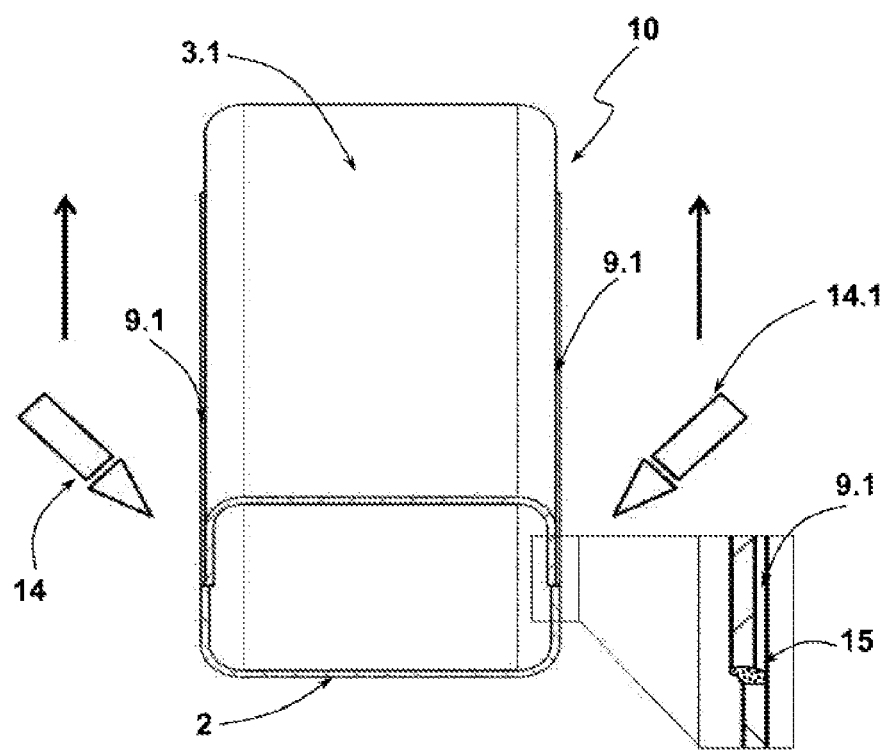
FIG. 4 shows a schematic perspective view of the carrier component from FIG. 2 with the process of joining its two half-shells.

Referring now to FIG. 4, after the positioning of the two half-shells, wherein there is lifting onto carrier component 10 from FIG. 2, and thus after positioning of half-shells 2 and 3.1 into their proper joining arrangement with provision of the protrusions 9.1 following the longitudinal extension of carrier component 10, the two half-shells 2, 3.1 are joined along said carrier, and that is by MAG welding in the embodiment shown. The welding apparatuses are shown in schematic form in FIG. 4 with reference numerals 14, 14.1. The welding direction is indicated by the arrow in FIG. 4. The welding process is carried out simultaneously on both contact sides, wherein this can be carried out in the same or in the opposite direction with respect to one another. This enables a single-step and thus simultaneous joining of the two half-shells 2, 3.1 with one another. A heat-related distortion as well as a twisting thereby caused is thereby kept as small as possible. The sectional enlargement from FIG. 4 indicates the weld seam created with reference numeral 15. However, other welding processes such as 2-wire, double-wire, MIG, WIG, plasma, laser, or laser hybrid welding are also possible here. Melted material for forming an inward fillet weld extends up to the inward protrusion, which is available for forming said fillet weld as weld filler material. The formation of a fillet weld on the inside counteracts a notch effect, which accounts for the special strength properties of the carrier component 10. Despite the small amount of melted material, the previously described weld seam can still be formed. Although welding only takes place externally, the points of contact are connected with one another with a full penetration weld.

With carrier components that are a rail and thus longitudinally extended, like carrier component 10, the welding process can be carried out very quickly, because preferably both sides can be welded simultaneously, which the previous prior art did not allow for with the type of contact points shown. Thus, conventional welding speeds, which are normally between 0.5 m/min and 1.5 m/min with MAG welding, can theoretically be doubled by the simultaneous use of a second welding torch. Due to the rapid cooling of the weld pool during the welding process, even small weld pool supports in the previously mentioned scope of greater than 0.0 mm can be considered completely sufficient. This is primarily also against the backdrop that the respectively liquid weld pool quantity is only minimal.

There are numerous options for one of ordinary skill in the art to implement the invention within the scope of the asserted claims without this having to be shown in greater detail within the scope of these embodiments. While a number of aspects and embodiments have been discussed above, those of skill in the art will recognize certain modifications, permutations, additions and sub-combinations therefor. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

1 Carrier component
2 Half-shell
3, 3.1 Half-shell
4 Belt
5 Leg
6 Leg
7 Point of contact
8 Point of contact
9, 9.1, 9.2 Protrusion
10 Carrier component
11 Carrier component
12 Half-shell
13 Half-shell
14, 14.1 Welding apparatus
15 Weld seam
A Outer wall spacing/span of the point of contact
I Inner wall spacing

The invention claimed is:

1. A carrier component for a vehicle application, comprising:
   two half-shells, which form the carrier component, that are U-shaped in cross section and externally welded to one another at their end faces facing one another, the end faces each respectively being a front side of a leg of a half-shell in contact with an opposing end face of the other half-shell, wherein each end face is terminated by an internal side face and an external side face of the leg of the half-shell, the external side face being opposite the internal side face, and wherein the internal side faces of each half-shell face toward an interior of the carrier component formed by the two half-shells;

wherein, in a position in which one of the two half-shells is arranged above the other half-shelf with their end faces adjoining one another:

the end faces of the lower half-shell protrude outward in relation to the external side faces of the upper half-shell, with the outward protrusion of each end face of the lower half-shell being >0.0 mm and <0.5 mm in relation to the opposing end face of the upper half-shell, and the end faces of one of the two half-shells protrude inward in relation to the internal side faces of the other half-shell, with the inward protrusion of each end face of the one half-shell providing weld filler metal for forming a fillet weld;

wherein the end faces of the half-shells are connected over their entire contact width with a weld seam and the inward protrusion of the one half-shell is integrated into the weld seam with formation of the fillet weld with the other half-shell, such that although welding is only carried out externally with respect to the carrier component, the legs of the two half-shells are connected to one another with a full penetration weld.

2. The carrier component of claim 1, wherein the outward protrusion of each end face of the one half-shell is greater than 0.0 mm and less than or equal to 0.1 mm in relation to the opposing end face of the other half-shell.

3. The carrier component of claim 1, wherein the overlap of adjacent ends faces of the two half-shells is 90% or more in relation to a width of one of the end faces, and wherein, if the adjacent end faces have two different widths, said overlap relates to a smaller width of the two different widths.

4. The carrier component of claim 1, wherein wall sections of the adjoining half-shells are in the same spatial position, at least with respect to end sections thereof supporting the end faces.

5. The carrier component of claim 1, wherein an outer wall spacing between the external side faces of the one half-shell is greater than an outer wall spacing between the external side faces of the other half-shell by double the width of the outward protrusion of each end face of the one half-shell.

6. The carrier component of claim 1, wherein the carrier component is a rail, a sub-frame, or a component of a sub-frame.

7. The carrier component of claim 1, wherein each half-shell is a formed steel sheet or aluminum sheet component.

8. A method to produce a carrier component formed by two half-shells for a vehicle application, comprising the following steps:

providing the two half-shells, wherein the two half-shells are U-shaped in cross section with ends faces, the end faces each respectively being a front side of a leg of a half-shell terminated by two side faces of the leg of the half-shell;

arranging and retaining the half-shells in a position in which one of the two half-shells is arranged above the other half-shell with their end faces adjoining one another, with allowance of a capillary gap between adjacent points of contact along the adjoining end faces, such that the end faces of one of the two half-shells protrude outward as relates to the end faces of the other half-shell and said outward protrusion is pointing upward, and the end faces of the other half-shell protrude inward as relates to the end faces of the one half-shell and said inward protrusion is pointing downward; and subsequently simultaneously welding the adjoining end faces along wall sections of the two half-shells opposite one another externally to form a weld seam extending over the overlap of the adjoining end faces along each wall section;

wherein welding is carried out such that the inward protrusion is used as a weld filler metal and integrated into the weld seam with the formation of a fillet weld, with the half-shells arranged such that the outward protrusion of each end face of the one half-shell is greater than 0.0 mm and less than or equal to 0.5 mm in relation to the opposing end face of the other half-shell, and wherein, although welding is only carried out externally with respect to the carrier component, the legs of the two half-shells are connected to one another with a full penetration weld.

9. The method of claim 8, wherein welding is carried out as MIG/MAG, 2-wire, double-wire, WIG, plasma, laser, or laser hybrid welding.

10. The method of claim 8, wherein during the welding step, degassing occurs towards an interior of the carrier component formed by the two half-shells due to the allowance of the capillary gap between adjacent points of contact along the adjoining end faces.

* * * * *